(12) United States Patent
Miller et al.

(10) Patent No.: US 9,439,345 B1
(45) Date of Patent: *Sep. 13, 2016

(54) METHOD AND COMPOSITION FOR PREVENTING PLUGGING IN MICRO-IRRIGATION SYSTEMS

(76) Inventors: John C. Miller, Fresno, CA (US); Deborah L. Miller, Fresno, CA (US)

(*) Notice: Subject to any disclaimer, the term of this patent is extended or adjusted under 35 U.S.C. 154(b) by 1235 days.

This patent is subject to a terminal disclaimer.

(21) Appl. No.: 13/385,477

(22) Filed: Feb. 22, 2012

Related U.S. Application Data

(63) Continuation-in-part of application No. 11/342,905, filed on Jan. 30, 2006, now abandoned.

(51) Int. Cl.
 *A01C 23/04* (2006.01)
(52) U.S. Cl.
 CPC .................................. *A01C 23/042* (2013.01)
(58) Field of Classification Search
 None
 See application file for complete search history.

(56) References Cited

U.S. PATENT DOCUMENTS

| | | | |
|---|---|---|---|
| 6,312,493 B1 | 11/2001 | Eltink et al. | |
| 7,708,799 B2 * | 5/2010 | Grech et al. | 71/29 |
| 9,148,993 B1 * | 10/2015 | Miller | A01C 23/042 |
| 9,161,489 B1 * | 10/2015 | Miller | C05F 11/00 |
| 2004/0035162 A1 * | 2/2004 | Williams et al. | 71/28 |
| 2004/0250582 A1 | 12/2004 | Ambri | |
| 2005/0022570 A1 | 2/2005 | Duarte-MacDonald | |
| 2007/0257127 A1 * | 11/2007 | Iverson | 239/10 |
| 2013/0034613 A1 * | 2/2013 | Kok et al. | 424/601 |

FOREIGN PATENT DOCUMENTS

CA 2005970 6/1990

* cited by examiner

*Primary Examiner* — Wayne Langel
(74) *Attorney, Agent, or Firm* — Joan I. Norek; Law Office of Joan I. Norek

(57) ABSTRACT

An agricultural micro-fertigation water includes a phosphate fertilizer, a water-soluble organic acid and a water-soluble organophosphonate, and is prepared by a method wherein the phosphate fertilizer is added to the irrigation water as a chaser to (addition with or after components of) the combination of a water-soluble organic acid and water-soluble organophosphonate to fully prevent precipitation and thus prevent plugging of a micro-irrigation system despite the addition of phosphate fertilizer in water having a precipitation factor of from 125 to 1,000 ppm, wherein said precipitation factor is a combined level of total alkalinity (as $CaCO_3$) in ppm and total hardness (as $CaCO_3$) in ppm.

11 Claims, No Drawings

METHOD AND COMPOSITION FOR PREVENTING PLUGGING IN MICRO-IRRIGATION SYSTEMS

This application is a continuation in part of application Ser. No. 11/342,905, filed on Jan. 30, 2006, now abandoned inventors Miller et al., for Compositions and Methods for Preventing Plugging in Micro-Irrigation Systems.

BACKGROUND OF THE INVENTION

The present invention relates to methods for adding phosphate fertilizers to micro-irrigation systems, compositions used therein and stabilized micro-irrigation water.

The agriculture industry has developed the practice of adding plant nutrients to the plant environs, such as the soil, to enhance crop growth and subsequent yields. These fertilizers come in a variety of formulations depending on the specific crop to be grown and its nutrient requirements.

Fertilizers generally are classified according to their NPK content. NPK is common terminology used in the fertilizer industry and stands for: (1) N—the amount of nitrogen in the formulation as N; (2) P—the amount of phosphorus in the formulation as $P_2O_5$; and (3) K—the amount of potassium in the formulation as $K_2O$.

Mankind learned to add these fertilizers centuries ago to grow better crops to feed the ever-increasing population. Initially, these materials were typical inorganic compounds that were mined by the local natives and simply added to the soil in which the crop was grown. As the population increased further, irrigation of the land to improve crops and crop yields became another common agricultural practice. Fertilization methods ultimately were facilitated by the practice of adding inorganic fertilizers to the water being used to irrigate the crops. The term "fertigation" is sometimes used for this combination of irrigation and fertilization. Although the early techniques were extremely crude by today's standards, the techniques nonetheless obtained better yields and drastically minimized the labor of applying these fertilizers.

Today's high demand for crops (food crops and otherwise) has turned agriculture into a technically-sophisticated business, and a business in which large corporate farms dominate the small family farm. The technical challenges faced by the modern agricultural industry include both the ever-increasing need for arable land, especially in the western and southwestern United States, and the decreasing availability and increasing cost of water. To meet the need for water conservation, today's technology includes micro-irrigation systems that deliver very precise amounts of water directly to the plant that is being grown. In the past 20 to 30 years a large percentage of crop producers in the western and southwestern United States have converted to irrigation systems utilizing this micro-irrigation technology.

Similar to the advent of "fertigation" practices generally, upon conversion to micro-irrigation systems, modern farmers began adding fertilizers to them. In micro-irrigation systems, unfortunately, water quality and the inclusion of fertilizers cause severe problems. The problems arise from a number of factors. (1) The most common sources of agricultural irrigation water, including micro-irrigation water, are reservoirs, lakes, ponds, canals, streams, rivers, wells, and water recycled from other uses, and combinations thereof, which waters contain various amounts of dissolved minerals. (2) Phosphate fertilizers can form insoluble salts and/or cause particulate formation when added to the irrigation water. Macro-irrigation systems mainly tolerate these conditions, while micro-irrigation systems are extremely intolerant.

The sensitivity of micro-irrigation systems to water quality and additives stems from the refinement of the components in a micro-irrigation system. In order to add precise amounts of water directly to the plant or crop being irrigated, micro-irrigation systems contain devices called emitters, micro-sprinklers or other such devices. These devices deliver the desired precise amounts of water so long as they do not plug or foul. Plugging occurs when deposits, from any source, build up inside these devices. The smallest particle or foreign material can cause fouling of these devices, because these devices have very tiny orifices and/or a long tortuous narrow passageway that provide the requisite pressure for delivery of precise amounts of water in a uniform manner to each plant in the crop being irrigated.

The addition of phosphate fertilizers to the micro-irrigation water increases the loading of inorganic salts over that already in the water. When the loading, or the combined loading, is too high, the solubilities of at least some of the naturally-occurring minerals and/or added compounds are exceeded and particulate formation increases dramatically. When particulates form, significant deposits begin to build up throughout the entire micro-irrigation system. The end result is plugging of the emitters or micro-sprinklers. Plugging results in uneven distribution of water and nutrients to the crop being irrigated. In some cases, complete shut-down of the irrigation system occurs. Therefore problem-free use of phosphate fertilizers in micro-irrigation systems is conventionally limited to the systems that use relatively pure water sources. When the water source is not sufficiently pure, the fertilizer is often distributed to the crop by means other than through the irrigation system, with the loss of "fertigation" benefits.

SUMMARY OF THE INVENTION

The present invention employs cost-effective additives that act synergistically in the stabilization of the agricultural irrigation water and fertilizer matrix in irrigation systems, particularly micro-irrigation systems. The term "micro-irrigation" as used herein and in the claims refers to microsprinkers, drip, and subsurface drip systems.

The present invention provides a stabilized, fortified micro-irrigation water which includes agricultural irrigation water, phosphate fertilizer and a synergistic combination of a water-soluble organic acid and a water-soluble organophosphonate. The present invention provides such micro-irrigation water that is stable for prolonged periods of time. This is important since once an irrigation system is shut down and the fertilizer is not flushed from the irrigation system, plugging may happen over time since all the water does not drain out of the irrigation system.

The present invention also provides a method of simultaneous micro-irrigation and fertilization of agricultural soil without plugging of a micro-irrigation system, which includes the steps of adding a synergistic level of a water-soluble organic acid and a water-soluble organophosphonate with, or upstream of (ahead of), the addition of, a phosphate fertilizer, to micro-irrigation water, whereby stabilized, fortified micro-irrigation water is formed, and then feeding said micro-irrigation water through the micro-irrigation system and then allowing the micro-irrigation system to deliver the micro-irrigation water to agricultural soil.

The method of the present invention comprises the addition of water-soluble organophosphonate and water-soluble organic acid with, or upstream of, the addition of a phosphate fertilizer to agricultural micro-irrigation water, to synergistically prevent precipitate or deposit formations despite the inclusion of the phosphate fertilizer, and thus prevent plugging of the micro-irrigation system. The present invention includes using a phosphate fertilizer/additive formulation that provides a non-plugging approach to the addition of phosphate fertilizer formulations to agricultural micro-irrigation water used in agricultural micro-irrigation systems.

DETAILED DESCRIPTION OF THE INVENTION

Most agricultural irrigation waters contain dissolved minerals. Water constituents such as calcium and bicarbonate alkalinity (alkalinity of a water due to the presence of bicarbonate ions, i.e., HCO3-) are particularly problematic. Calcium concentrations exceeding 2-3 meq/liter (100-150 ppm as $CaCO_3$) can cause precipitates to form during the injection of phosphate fertilizers, and the precipitation proclivity is heightened by water bicarbonate alkalinity. Bicarbonate alkalinity concentrations exceeding about 2 meq/liter, which is 200 ppm as $CaCO_3$, in the presence of calcium, can cause calcium carbonate precipitation. The Solubility Chart below provides an overview of inorganic anion/cation incompatibilities, that is, anions and cations that, when both are present, lead to insoluble inorganic salt formation that can cause plugging in micro-irrigation systems.

CHART 1

Solubility Chart For Common Irrigation-Systems Anions And Cations

| Cation | Anion | | | | | | | |
|---|---|---|---|---|---|---|---|---|
| | $Cl^-$ | $HCO_3^-$ | $OH^-$ | $NO_3^-$ | $CO_3^{-2}$ | $SO_4^{-2}$ | $S^{-2}$ | $PO_4^{-3}$ |
| $Na^+$ | S | S | S | S | S | S | S | S |
| $K^+$ | S | S | S | S | S | S | S | S |
| $NH4^+$ | S | S | S | S | S | S | S | S |
| $H^+$ | S | S | $H_2O$ | S | $CO_2$ | S | $H_2S$ | S |
| $Ca^{+2}$ | S | SS | VSS | S | I | VSS | XXX | I |
| $Mg^{+2}$ | S | S | I | S | VSS | S | XXX | I |
| $Fe^{+2}$ | S | SS | VSS | S | VSS | S | I | I |
| $Fe^{+3}$ | S | I | I | S | I | S | XXX | I |
| $Mn^{+2}$ | S | XXX | I | S | I | S | I | I |

In Chart 1, S means soluble (over 5,000 ppm), SS means slightly soluble (2,000 to 5,000 ppm), VSS means very slightly soluble (20-2,000 ppm), I means insoluble (<20 ppm) and XXX means does not form (is not a compound). From Kemmer, Frank N., Water: The Universal Solvent, Basic Chemistry, p. 37, Nalco Chemical Company 1977.

As seen from the solubility information in Chart 1, the addition of phosphates, such as phosphate fertilizers, to agricultural micro-irrigation waters that contain hardness (calcium) can cause precipitation that would result in plugging of micro-irrigation systems, and such precipitation potential is heightened by the water bicarbonate alkalinity. To eliminate the potential plugging of the micro-irrigation system, without eliminating the beneficial inclusion of fertilizer therein, the present invention adds a synergistic combination or mixture of a water-soluble organophosphonate and a water-soluble, low-molecular weight organic acid that, when added with or ahead of the phosphate fertilizer, stabilizes the water-phosphate fertilizer matrix.

The water-soluble organophosphonate is selected from a group of compounds of Formulas I and II below,

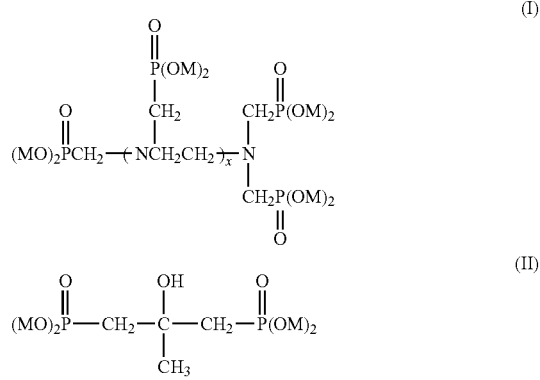

wherein x is either zero or one and wherein each M is a water-soluble cation independently selected from the group consisting of hydrogen, ammonium, potassium and sodium.

In preferred embodiment, the water-soluble organophosphonate is selected from the group consisting of ATMP, which stands for amino-tri(methylene phosphonic acid), and HEDP, which stands for 1-hydroxyethylidene-1,1-diphosphonic acid, both of which are commercially available in bulk quantities suitable for large-scale agricultural applications.

The water-soluble organic acid is selected from a group of compounds of Formula III below,

wherein R is a hydrogen, lower alkyl of one to two carbon atoms (e.g. methyl, ethyl) or substituted lower alkyl of one to two carbon atoms substituted with hydroxyl, carboxylic acid and a salt of carboxylic acids (—COOM') wherein each M' is a water-soluble cations selected independently from the group consisting of hydrogen, ammonium, potassium and sodium.

In preferred embodiment, the water-soluble organic acid is selected from the group consisting of formic acid, acetic acid, propionic acid, maleic acid and citric acid, and the ammonium, potassium and sodium salts thereof, all of which are particularly active and are commercially available in bulk quantities suitable for large-scale agricultural applications.

Examples

The efficacy of the present invention is illustrated in the data set forth in Tables 1 through 13. In more detail, to demonstrate the efficacies of the method of the present invention in eliminating the plugging potential in micro-irrigation systems, formulations with varying levels of fertilizers, and with and without varying levels of the water-soluble organophosphonate and/or the water-soluble organic acid, were prepared, and then added to various concentrations of hard-alkaline water to determine if precipitation occurred. The fertilizer types (by NPK, wherein N is the amount of nitrogen as N, P is the amount of phosphorus as $P_2O_5$ and K is the amount of potassium (as $K_2O$)) and levels (in weight percent based on weight of water), the water precipitation factor ("pf") levels (the combined levels of total alkalinity and total hardness in ppm, both in terms of $CaCO_3$), the organic acid and organophosphonate levels in ppm (parts per million based on weight of water), and the resultant precipitation level determined as water turbidity in Nephlometric Turbidity Units (NTU), are set forth in Tables 1-13. In addition, the following abbreviations are used in Tables 1-13: ATMP stands for amino-tri(methylene phosphonic acid) and HEDP stands for 1-hydroxyethylidene-1, 1-diphosphonic acid.

TABLE 1

Stability of Water and Fertilizer, With and Without Treatment
Various Concentrations of Fertilizer, Organophosphonate and
Organic Acid; Differing Water Quality

| Fertilizer Type (NPK) | Fertilizer Level (wt. %) | Water Precipitation Factor Level (ppm) | Treatment A Organic Acid | | Treatment B Organophosphonate | | Turbidity (NTU) |
|---|---|---|---|---|---|---|---|
| | | | Level (ppm) | Type | Level (ppm) | Type | |
| None   | 0.0  | 500 | 0  | None   | 0  | None | 2  |
| 0-21-0 | 0.1  | 500 | 0  | None   | 0  | None | 98 |
| 0-21-0 | 0.1  | 500 | 70 | Formic | 10 | ATMP | 2  |
| 0-21-0 | 0.1  | 500 | 70 | Acetic | 10 | ATMP | 2  |
| 0-21-0 | 0.1  | 500 | 70 | Formic | 10 | HEDP | 2  |
| 0-21-0 | 0.1  | 500 | 70 | Acetic | 10 | HEDP | 3  |
| None   | 0.0  | 125 | 0  | None   | 0  | None | 2  |
| 0-21-0 | 0.02 | 125 | 0  | None   | 0  | None | 23 |
| 0-21-0 | 0.02 | 125 | 14 | Formic | 2  | ATMP | 2  |
| 0-21-0 | 0.02 | 125 | 14 | Acetic | 2  | ATMP | 2  |
| 0-21-0 | 0.02 | 125 | 14 | Formic | 2  | HEDP | 2  |
| 0-21-0 | 0.02 | 125 | 14 | Acetic | 2  | HEDP | 2  |

TABLE 2

Stability of Water and Fertilizer, With and Without Treatment
Various Concentrations of Fertilizer, Organophosphonate and
Organic Acid; Differing Water Quality

| Fertilizer Type (NPK) | Fertilizer Level (wt. %) | Water Precipitation Factor Level (ppm) | Treatment A Organic Acid | | Treatment B Organophosphonate | | Turbidity (NTU) |
|---|---|---|---|---|---|---|---|
| | | | Level (ppm) | Type | Level (ppm) | Type | |
| None   | 0.0  | 500 | 0  | None   | 0  | None | 2   |
| 7-21-0 | 0.1  | 500 | 0  | None   | 0  | None | 206 |
| 7-21-0 | 0.1  | 500 | 70 | Formic | 10 | ATMP | 2   |
| 7-21-0 | 0.1  | 500 | 70 | Acetic | 10 | ATMP | 2   |
| 7-21-0 | 0.1  | 500 | 70 | Formic | 10 | HEDP | 2   |
| 7-21-0 | 0.1  | 500 | 70 | Acetic | 10 | HEDP | 2   |
| None   | 0.0  | 125 | 0  | None   | 0  | None | 2   |
| 7-21-0 | 0.02 | 125 | 0  | None   | 0  | None | 31  |
| 7-21-0 | 0.02 | 125 | 14 | Formic | 2  | ATMP | 2   |
| 7-21-0 | 0.02 | 125 | 14 | Acetic | 2  | ATMP | 2   |
| 7-21-0 | 0.02 | 125 | 14 | Formic | 2  | HEDP | 3   |
| 7-21-0 | 0.02 | 125 | 14 | Acetic | 2  | HEDP | 2   |

TABLE 3

Stability of Water and Fertilizer, With and Without Treatment
Synergistic Effect of Organophosphonate and Organic Acid

| Fertilizer Type (NPK) | Fertilizer Level (wt. %) | Water Precipitation Factor Level (ppm) | Treatment A Organic Acid | | Treatment B Organophosphonate | | Turbidity (NTU) |
|---|---|---|---|---|---|---|---|
| | | | Level (ppm) | Type | Level (ppm) | Type | |
| None   | 0.0 | 500 | 0  | None   | 0  | None | 2  |
| 0-21-0 | 0.1 | 500 | 0  | None   | 0  | None | 98 |
| 0-21-0 | 0.1 | 500 | 70 | Formic | 0  | None | 55 |
| 0-21-0 | 0.1 | 500 | 0  | None   | 10 | ATMP | 63 |
| 0-21-0 | 0.1 | 500 | 70 | Formic | 10 | ATMP | 2  |

TABLE 4

Stability of Water and Fertilizer, With and Without Treatment
Synergistic Effect of Organophosphonate and Organic Acid

| Fertilizer Type (NPK) | Fertilizer Level (wt. %) | Water Precipitation Factor Level (ppm) | Treatment A Organic Acid | | Treatment B Organophosphonate | | Turbidity (NTU) |
|---|---|---|---|---|---|---|---|
| | | | Level (ppm) | Type | Level (ppm) | Type | |
| None | 0.0 | 500 | 0 | None | 0 | None | 2 |
| 0-21-0 | 0.1 | 500 | 0 | None | 0 | None | 98 |
| 0-21-0 | 0.1 | 500 | 70 | Acetic | 0 | None | 49 |
| 0-21-0 | 0.1 | 500 | 0 | None | 10 | ATMP | 63 |
| 0-21-0 | 0.1 | 500 | 70 | Acetic | 10 | ATMP | 2 |

TABLE 5

Stability of Water and Fertilizer, With and Without Treatment
Synergistic Effect of Organophosphonate and Organic Acid

| Fertilizer Type (NPK) | Fertilizer Level (wt. %) | Water Precipitation Factor Level (ppm) | Treatment A Organic Acid | | Treatment B Organophosphonate | | Turbidity (NTU) |
|---|---|---|---|---|---|---|---|
| | | | Level (ppm) | Type | Level (ppm) | Type | |
| None | 0.0 | 500 | 0 | None | 0 | None | 2 |
| 0-21-0 | 0.1 | 500 | 0 | None | 0 | None | 98 |
| 0-21-0 | 0.1 | 500 | 70 | Formic | 0 | None | 55 |
| 0-21-0 | 0.1 | 500 | 0 | None | 10 | HEDP | 59 |
| 0-21-0 | 0.1 | 500 | 70 | Formic | 10 | HEDP | 2 |

TABLE 6

Stability of Water and Fertilizer, With and Without Treatment
Synergistic Effect of Organophosphonate and Organic Acid

| Fertilizer Type (NPK) | Fertilizer Level (wt. %) | Water Precipitation Factor Level (ppm) | Treatment A Organic Acid | | Treatment B Organophosphonate | | Turbidity (NTU) |
|---|---|---|---|---|---|---|---|
| | | | Level (ppm) | Type | Level (ppm) | Type | |
| None | 0.0 | 500 | 0 | None | 0 | None | 2 |
| 0-21-0 | 0.1 | 500 | 0 | None | 0 | None | 98 |
| 0-21-0 | 0.1 | 500 | 70 | Acetic | 0 | None | 49 |
| 0-21-0 | 0.1 | 500 | 0 | None | 10 | HEDP | 59 |
| 0-21-0 | 0.1 | 500 | 70 | Acetic | 10 | HEDP | 2 |

TABLE 7

Stability of Water and Fertilizer, With and Without Treatment
Synergistic Effect of Organophosphonate and Organic Acid

| Fertilizer Type (NPK) | Fertilizer Level (wt. %) | Water Precipitation Factor Level (ppm) | Treatment A Organic Acid | | Treatment B Organophosphonate | | Turbidity (NTU) |
|---|---|---|---|---|---|---|---|
| | | | Level (ppm) | Type | Level (ppm) | Type | |
| None | 0.0 | 500 | 0 | None | 0 | None | 2 |
| 7-21-0 | 0.1 | 500 | 0 | None | 0 | None | 206 |
| 7-21-0 | 0.1 | 500 | 70 | Formic | 0 | None | 129 |
| 7-21-0 | 0.1 | 500 | 0 | None | 10 | ATMP | 138 |
| 7-21-0 | 0.1 | 500 | 70 | Formic | 10 | ATMP | 2 |

TABLE 8

Stability of Water and Fertilizer, With and Without Treatment
Synergistic Effect of Organophosphonate and Organic Acid

| Fertilizer Type (NPK) | Fertilizer Level (wt. %) | Water Precipitation Factor Level (ppm) | Treatment A Organic Acid Level (ppm) | Type | Treatment B Organophosphonate Level (ppm) | Type | Turbidity (NTU) |
|---|---|---|---|---|---|---|---|
| None | 0.0 | 500 | 0 | None | 0 | None | 2 |
| 7-21-0 | 0.1 | 500 | 0 | None | 0 | None | 206 |
| 7-21-0 | 0.1 | 500 | 70 | Acetic | 0 | None | 140 |
| 7-21-0 | 0.1 | 500 | 0 | None | 10 | ATMP | 138 |
| 7-21-0 | 0.1 | 500 | 70 | Acetic | 10 | ATMP | 2 |

TABLE 9

Stability of Water and Fertilizer, With and Without Treatment
Synergistic Effect of Organophosphonate and Organic Acid

| Fertilizer Type (NPK) | Fertilizer Level (wt. %) | Water Precipitation Factor Level (ppm) | Treatment A Organic Acid Level (ppm) | Type | Treatment B Organophosphonate Level (ppm) | Type | Turbidity (NTU) |
|---|---|---|---|---|---|---|---|
| None | 0.0 | 500 | 0 | None | 0 | None | 2 |
| 7-21-0 | 0.1 | 500 | 0 | None | 0 | None | 206 |
| 7-21-0 | 0.1 | 500 | 70 | Formic | 0 | None | 129 |
| 7-21-0 | 0.1 | 500 | 0 | None | 10 | HEDP | 143 |
| 7-21-0 | 0.1 | 500 | 70 | Formic | 10 | HEDP | 2 |

TABLE 10

Stability of Water and Fertilizer, With and Without Treatment
Synergistic Effect of Organophosphonate and Organic Acid

| Fertilizer Type (NPK) | Fertilizer Level (wt. %) | Water Precipitation Factor Level (ppm) | Treatment A Organic Acid Level (ppm) | Type | Treatment B Organophosphonate Level (ppm) | Type | Turbidity (NTU) |
|---|---|---|---|---|---|---|---|
| None | 0.0 | 500 | 0 | None | 0 | None | 2 |
| 7-21-0 | 0.1 | 500 | 0 | None | 0 | None | 206 |
| 7-21-0 | 0.1 | 500 | 70 | Acetic | 0 | None | 140 |
| 7-21-0 | 0.1 | 500 | 0 | None | 10 | HEDP | 143 |
| 7-21-0 | 0.1 | 500 | 70 | Acetic | 10 | HEDP | 2 |

The data shown in Tables 11, 12 and 13 below was generated using the same test procedure except the source of the water in which the test was performed was well water actually used on a ranch as the source of its micro-irrigation water.

The impurities were determined on the actual well sample of Test 1 (Tables 11 and 12) as: total hardness of 600 ppm as $CaCO_3$ and total alkalinity of 300 ppm as $CaCO_3$, which provide a precipitation factor of 900. In addition the following cations and anions were detected: Mn at 0.19 ppm as Mn, Fe at 0.04 ppm as Fe, $SiO_2$ at 30 ppm as $SiO_2$, $SO_4$ at 440 ppm as $SO_4$ and Cl at 225 ppm as Cl.

The impurities were determined on the actual well sample of Test 2 (Table 13) as: total hardness of 600 ppm as $CaCO_3$ and total alkalinity of 300 ppm as $CaCO_3$, which provide a precipitation factor of 900. In addition the following cations and anions were detected: Mn at 0.08 ppm as Mn, Fe at <0.01 ppm as Fe, $SiO_2$ at 45 ppm as $SiO_2$, $SO_4$ at 980 ppm as $SO_4$ and Cl at 125 ppm as Cl.

The commercial fertilizer used in the comparison labeled "commercial" shown in Table 13 is sold under the trade name of Structure by Actagro, LLC. of Biola, Calif., and it is identified in the trade literature as a 7-21-0 fertilizer containing humic acid as a soil amendment.

TABLE 11

Stability of Water and Fertilizer, With and Without Treatment
Effect of Organophosphonate and Organic Acid; Well Water Samples

| Fertilizer Type (NPK) | Fertilizer Level (wt. %) | Water Precipitation Factor Level (Test #) | Treatment A Organic Acid Level (ppm) | Type | Treatment B Organophosphonate Level (ppm) | Type | Turbidity (NTU) |
|---|---|---|---|---|---|---|---|
| None | 0.0 | Test 1 | 0 | None | 0 | None | 2 |
| 0-21-0 | 0.1 | Test 1 | 0 | None | 0 | None | 50 |
| 0-21-0 | 0.1 | Test 1 | 70 | Formic | 10 | ATMP | 2 |
| 0-21-0 | 0.1 | Test 1 | 70 | Acetic | 10 | ATMP | 2 |
| 0-21-0 | 0.1 | Test 1 | 70 | Formic | 10 | HEDP | 2 |
| 0-21-0 | 0.1 | Test 1 | 70 | Acetic | 10 | HEDP | 2 |
| 0-21-0 | 0.02 | Test 1 | 0 | None | 0 | None | 34 |
| 0-21-0 | 0.02 | Test 1 | 14 | Formic | 2 | ATMP | 2 |
| 0-21-0 | 0.02 | Test 1 | 14 | Acetic | 2 | ATMP | 2 |
| 0-21-0 | 0.02 | Test 1 | 14 | Formic | 2 | HEDP | 2 |
| 0-21-0 | 0.02 | Test 1 | 14 | Acetic | 2 | HEDP | 2 |

TABLE 12

Stability of Water and Fertilizer, With and Without Treatment
Effect of Organophosphonateand Organic Acid;Well Water Samples

| Fertilizer Type (NPK) | Fertilizer Level (wt. %) | Water Precipitation Factor Level (Test #) | Treatment A Organic Acid Level (ppm) | Type | Treatment B Organophosphonate Level (ppm) | Type | Turbidity (NTU) |
|---|---|---|---|---|---|---|---|
| None | 0.0 | Test 1 | 0 | None | 0 | None | 2 |
| 7-21-0 | 0.1 | Test 1 | 0 | None | 0 | None | 158 |
| 7-21-0 | 0.1 | Test 1 | 70 | Formic | 10 | ATMP | 2 |
| 7-21-0 | 0.1 | Test 1 | 70 | Acetic | 10 | ATMP | 2 |
| 7-21-0 | 0.1 | Test 1 | 70 | Formic | 10 | HEDP | 2 |
| 7-21-0 | 0.1 | Test 1 | 70 | Acetic | 10 | HEDP | 3 |
| 7-21-0 | 0.02 | Test 1 | 0 | None | 0 | None | 41 |
| 7-21-0 | 0.02 | Test 1 | 14 | Formic | 2 | ATMP | 2 |
| 7-21-0 | 0.02 | Test 1 | 14 | Acetic | 2 | ATMP | 2 |
| 7-21-0 | 0.02 | Test 1 | 14 | Formic | 2 | HEDP | 2 |
| 7-21-0 | 0.02 | Test 1 | 14 | Acetic | 2 | HEDP | 2 |

TABLE 13

Stability of Water and Fertilizer, With and Without Treatment
Effect of Commercial versus Organophosphonate
and Organic Acid; Well Water Samples

| Fertilizer Type (NPK) | Fertilizer Level (wt. %) | Water Precipitation Factor Level (Test #) | Treatment A Organic Acid Level (ppm) | Type | Treatment B Organophosphonate Level (ppm) | Type | Turbidity (NTU) |
|---|---|---|---|---|---|---|---|
| None | 0.0 | Test 2 | 0 | None | 0 | None | 2 |
| commercial | 0.1 | Test 2 | 0 | None | 0 | None | 424 |
| 7-21-0 | 0.1 | Test 2 | 70 | Formic | 10 | ATMP | 2 |
| 7-21-0 | 0.1 | Test 2 | 70 | Acetic | 10 | ATMP | 2 |
| 7-21-0 | 0.1 | Test 2 | 70 | Formic | 10 | HEDP | 2 |
| 7-21-0 | 0.1 | Test 2 | 70 | Acetic | 10 | HEDP | 2 |

Conditions and Dosage

The present invention provides full prevention of precipitation and synergistic action of the organic acid/organophosphonate combination under the circumstance of agricultural fertigation at a 0.02 to 1.0 wt. percent level of a conventional phosphate fertilizer, such as the 0-21-0 and 7-21-0 NPK fertilizers used in the present examples, which in terms of phosphate is a range of from 42 to 2,100 ppm fertilizer phosphate (as P2O5), or simply 40 to 2,100 ppm fertilizer phosphate (as P2O5). The dosage ranges of the organic acid and the organophosphonate for such fertilizer levels are dependent or related to the irrigation water's precipitation factor as set forth below in Equations ("Eq.") 1 and 2 below:

$$\text{df.ac} = \text{pf (in ppm)}/\text{ac.dos (in ppm)} = \geq 7 \text{ and} \leq 70 \quad \text{Eq. 1}$$

or $$\text{pf (in ppm)}/\geq 7 \text{ and} \leq 70 = \text{ac.dos (in ppm)}$$

$$\text{df.op} = \text{pf (in ppm)}/\text{op.dos (in ppm)} = \geq 50 \text{ and} \leq 500 \quad \text{Eq. 2}$$

or $$\text{pf(in ppm)}/\geq 7 \text{ and} \leq 70 = \text{ac.dos (in ppm)}$$

wherein df.ac is the dosage factor for the organic acid, df.op is the dosage factor of the organophosphonate, pf is the water precipitation factor in ppm (the combined level of total alkalinity and total hardness in ppm, both in terms of $CaCO_3$), ac.dos is the dosage of acid and op.dos is the dosage of organophosphonate, each respectively in ppm based on total weight of water, and the organic acid and organophosphonate are as defined above.

The irrigation water of, and for the method of, the present invention has a precipitation factor of 125 to 1,000.

Summary of the Data

The data set forth in Tables 1-13 demonstrates the full prevention of precipitation, and as to the data in Tables 3-10, the synergistic action of the organic acid/organophosphonate combination, (a) under the circumstance of agricultural fertigation at a level of 42 to 2,100 ppm fertilizer phosphate (as $P_2O_5$) based on the weight of the water (0.02 to 1.0 wt. percent level of a 0-21-0 and 7-21-0 NPK fertilizers) and (b) with dosages of the organic acid and the organophosphonate within Equations 1 and 2 above respectively.

The data set forth in Tables 1-13 demonstrates that for each pf level and fertilizer level exemplified, significant precipitation occurs with the addition of the fertilizer in the absence of the organic acid/organophosphonate combination of the present invention, and (with respect to the data in Tables 3-10) in the absence of one of the two components of the organic acid/organophosphonate combination of the present invention.

The data set forth in Tables 1-13 demonstrates that for each pf level, fertilizer level and dosage level of the organic acid/organophosphonate combination of the present invention exemplified, full prevention of precipitation was provided (the turbidity level in all instances being the same turbidity as distilled water.) Without the addition of the present invention's organic acid/organophosphonate combination with the 0-21-0 and 7-21-0 fertilizers, significant turbidity is realized.

Since turbidity is a measure of precipitation, and since the present invention's organic acid/organophosphonate combination prevents turbidity formation upon the addition of a phosphate fertilizer (with or after the addition of the combination), there would be no precipitate formation when a phosphate fertilizer is added to, and therefore no plugging will occur in, a micro-irrigation system despite the hard and alkaline irrigation waters used.

The data set forth in Tables 1 and 2 above demonstrates that, using (a) two water precipitation factor levels, (b) two types of phosphate fertilizer (0-21-0 and 7-21-0 NPK fertilizers), both at levels of 42 and 210 ppm fertilizer phosphate (as $P_2O_5$), (c) four combinations of organic acids (formic and acetic) and organophosphonates (ATMP and HEDP), (d) each organic acid at a dosage factor (df.ac) of 7.1 and 8.9 and (e) each organophosphonate at a dosage factor (df.op) of 50 and 62.5, full prevention of precipitation is achieved with the combination of the present invention.

The data set forth in Tables 3 to 10 above demonstrate that, using (a) a single water precipitation factor level (500 ppm), (b) two types of phosphate fertilizer (0-21-0 and 7-21-0 NPK fertilizers) at the level of 210 ppm fertilizer phosphate (as $P_2O_5$), (c) four combinations of organic acids and organophosphonates (formic acid and acetic acid at a dosage factor (df.ac) of 7.1, and ATMP and HEDP at a dosage factor (df.op) of 50), full prevention of precipitation is achieved without fail by the combination provided in the method of the present invention and full prevention is never achieved using either of the organic acids alone or either of the organophosphonates alone at the same levels. In addition, the additives of the normalized percent reductions of precipitation when the organic acid and the organophosphonate of each data set are used alone fail to reach the 100% level of the combination. The normalized percent reductions of precipitation were determined using Equation ("Eq,") 3 below, and the normalized percent reductions of precipitation for the organic acid alone and the organophosphonate alone for the data of Tables 3 to 10, plus their additives and other relevant parameters, are set forth in Table 14 below.

$$(n\text{Blank}T - n\text{Additive}T)/n\text{Blank}T \times 100 = \text{normalized \%}$$
$$\text{reduction of precipitation} \quad \text{Eq. 3}$$

wherein nBlankT is the NTU turbidity of the blank (fertilizer but no additive) less 2 (the NTU turbidity of the water prior to addition), nAdditiveT is the NTU turbidity when a single additive (organic acid or organophosphonate) is used alone less 2 (the NTU turbidity of the water prior to addition).

TABLE 14

Additives of Normalized PercentReduction of Precipitation (% Reduct.)
Organic Acids andOrganophosphonates Used Separately
Basic DataSource - Tables 3 to 10

| Data Source (Table) | Organic Acid | | | | Organophosphonate | | | | Added % Reduct. |
|---|---|---|---|---|---|---|---|---|---|
| | Type | Dosage Factor (df.ac) | Turbidity (NTU) | % Reduct. | Type | Dosage Factor (df.op) | Turbidity (NTU) | % Reduct. | |
| 3 | Formic | 7.1 | 55 | 45 | ATMP | 50 | 63 | 36 | 81 |
| 4 | Acetic | 7.1 | 49 | 51 | ATMP | 50 | 63 | 36 | 87 |
| 5 | Formic | 7.1 | 55 | 45 | HEDP | 50 | 59 | 41 | 86 |
| 6 | Acetic | 7.1 | 49 | 51 | HEDP | 50 | 59 | 41 | 92 |
| 7 | Formic | 7.1 | 129 | 38 | ATMP | 50 | 138 | 33 | 71 |
| 8 | Acetic | 7.1 | 140 | 32 | ATMP | 50 | 138 | 33 | 65 |

TABLE 14-continued

Additives of Normalized PercentReduction of Precipitation (% Reduct.)
Organic Acids andOrganophosphonates Used Separately
Basic DataSource - Tables 3 to 10

| | | Organic Acid | | | | Organophosphonate | | | |
|---|---|---|---|---|---|---|---|---|---|
| Data Source (Table) | Type | Dosage Factor (df.ac) | Turbidity (NTU) | % Reduct. | Type | Dosage Factor (df.op) | Turbidity (NTU) | % Reduct. | Added % Reduct. |
| 9 | Formic | 7.1 | 129 | 38 | HEDP | 50 | 143 | 31 | 69 |
| 10 | Acetic | 7.1 | 140 | 32 | HEDP | 50 | 143 | 31 | 63 |

In contrast to these well below 100% performance additives of the organic acids and organophosphonates when used alone, in all instances the combinations of the organic acids and organophosphonates provided a normalized percent reduction of precipitation of 100%.

The data set forth in Tables 11 to 13 (using actual well-derived irrigation water samples) demonstrate that significant precipitation occurs when either of the conventional phosphate fertilizers (0-21-0 and 7-21-0 NPK fertilizers) are added at levels of 210 and 42 ppm fertilizer phosphate (as P2O5). Further, the precipitation is extreme, producing a 424 NTU turbidity, when a commercial product having a 7-21-0 NPK fertilizer and a humic acid soil amendment is added at a level of 210 ppm fertilizer phosphate (as P2O5) to the well-derived irrigation water of Test 2. Nonetheless, the addition of any combination of organic acid (formic or acetic) and organophosphonate (ATMP or HEDP) at dosages that provided low-end and high-end dosage factors, namely a df.ac of 12 and 64 (within the permissible df.ac range of 7-70), and a df.op of 90 and 450 (within the permissible df.op range of 50-500), achieved full prevention of precipitation. The well-derived irrigation waters used were taken from a ranch that was experiencing plugging problems in its micro-irrigation system when using the well water and conventional phosphate fertilizers. As indicated above, both Test 1 and Test 2 well-derived irrigation water samples contained other multi-valent anions and cations, and their presence introduced real-world water-chemistry challenges.

Additional Comments

Since the addition of a phosphate fertilizer at a level of 42 to 2,100 ppm fertilizers phosphate (as P2O5) to irrigation water having a precipitation factor of from 125 to 1,000 in the absence of both the present organic acid and organophosphonate will result in measurable precipitation, and since subsequent addition(s) to provide both the organic acid and the organophosphonate will not eliminate the preexisting precipitation, the addition order(s) are not arbitrary, but instead compulsory. The phosphate fertilizer cannot be added to the irrigation water at a time when either the organic acid or the organophosphonate of the present method is absent. The phosphate fertilizer must be added as a chaser to (addition with or after the components) of the organic acid/organophosphonate combination. In other words, the phosphate fertilizer is added (a) simultaneously with the organic acid/organophosphonate combination, (b) after the organic acid/organophosphonate combination (which may be added together or separately), (c) after the organic acid and simultaneously with the organophosphonate, (d) after the organophosphonate and simultaneously with the organic acid, or (e) added after a portion of one or both of organic acid and organophosphonate and simultaneously with the remainder of the organic acid and organophosphonate. Therefore, while it is not required to add the organic acid and the organophosphonate at the same time, each must be added either ahead of, or with, the phosphate fertilizer. It is convenient, but not necessary, to simultaneously add the organic acid, organophosphonate and phosphate fertilizer.

As mentioned above, although full prevention of precipitation upon addition of a phosphate fertilizer is the primary achievement of the present method, continued stabilization of the treated irrigation water is also important because some amount of treated irrigation water will typically be retained with the irrigation system lines between irrigation periods. The method of the present invention will not merely provide full prevention of precipitation from the time a phosphate fertilizer is added to an active irrigation system to the time it is discharged therefrom when delivered to a plant's environs during the same irrigation period, the method of the present invention is believed to provide enduring stabilization, preventing precipitation over periods of days or even weeks, even in a static environment.

Long-Felt Need

The present invention is believed to fulfill a long-standing and long-felt need of the agricultural industry and is expected to garner great commercial success attributable to such fulfillment.

While the foregoing written description of the invention enables one of ordinary skill in the art to make and use the invention, and to make and use what is presently considered the best mode of the invention, those of ordinary skill in the art will understand and appreciate the existence of variations, combinations and equivalents of the specific embodiments, methods and examples provided herein. The present invention should not be limited by the above described embodiments, methods and examples.

We claim:

1. A method of simultaneous micro-irrigation and phosphate fertilization of agricultural soil with irrigation water having a pre-additive precipitation factor of from 125 to 1,000 ppm, wherein said precipitation factor is a combined level of total alkalinity (as $CaCO_3$) in ppm and total hardness (as $CaCO_3$) in ppm, without plugging of a micro-irrigation system, comprising the steps of:

(step 1) adding a phosphate fertilizer to said irrigation water at a level of 40 to 2,100 ppm fertilizer phosphate (as P2O5) as a chaser to an addition of a combination of a water-soluble organic acid selected from the group consisting of formic acid and the ammonium, potassium and sodium salts thereof, and a water-soluble organophosphonate selected from the group consisting of compounds of Formulas I and II,

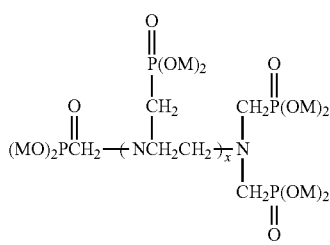

Formula (I)

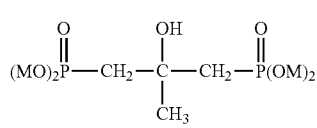

(Formula II)

wherein x is either zero or one and wherein each M is a water-soluble cation independently selected from the group consisting of hydrogen, ammonium, potassium and sodium, to said irrigation water, said combination of said organic acid and said organophosphonate comprising a dosage of said organic acid of ac.dos (in ppm)=pf (in ppm)/>7 and <70 wherein ac.dos is the dosage of said water-soluble organic acid and pf is said precipitation factor of said irrigation water, and a dosage of said organophosphonate of op.dos (in ppm)=pf (in ppm)/>50 and <500 wherein op.dos is the dosage of said organophosphonate and pf is said precipitation factor of said irrigation water;

(step 2) then feeding said irrigation water through said micro-irrigation system; and (step 3) then allowing said micro-irrigation system to deliver said irrigation water to said agricultural soil.

2. A method of simultaneous micro-irrigation and phosphate fertilization of agricultural soil according to claim 1 wherein said step 1 is comprised of:

(step 1.1) adding said phosphate fertilizer, said organic acid and said organophosphonate simultaneously to said irrigation water.

3. A method of simultaneous micro-irrigation and phosphate fertilization of agricultural soil according to claim 1 wherein step 1 is comprised of:

(sub-step 1a) adding said organic acid and said organophosphonate to said irrigation water; and (sub-step 1b) then adding said phosphate fertilizer to said irrigation water.

4. A method of simultaneous micro-irrigation and phosphate fertilization of agricultural soil according to claim 1 wherein step 1 is comprised of:

(sub-step 1c) adding said organic acid to said irrigation water; and (sub-step 1d) then adding said organophosphonate and said phosphate fertilizer simultaneously to said irrigation water.

5. A method of simultaneous micro-irrigation and phosphate fertilization of agricultural soil according to claim 1 wherein step 1 is comprised of:

(sub-step 1e) adding said organophosphonate to said irrigation water; and (sub-step 1f) then adding said organic acid and said phosphate fertilizer simultaneously to said irrigation water.

6. A method of simultaneous micro-irrigation and phosphate fertilization of agricultural soil according to claim 1 wherein said organophosphonate is selected from the group consisting of amino-tri(methylene phosphonic acid) and 1-hydroxyethylidene-1,1-diphosphonic acid and the ammonium, potassium and sodium salts thereof.

7. A method of simultaneous micro-irrigation and phosphate fertilization of agricultural soil according to claim 1
wherein said organophosphonate is selected from the group consisting of amino-tri(methylene phosphonic acid and 1-hydroxyethylidene-1,1-diphosphonic acid) and the ammonium, potassium and sodium salts thereof.

8. A method of simultaneous micro-irrigation and phosphate fertilization of agricultural soil according to claim 1 wherein said water-soluble organic acid and said water-soluble organophosphonate comprise an additive, and wherein step 1 is comprised of:

(sub-step 1g) adding a portion of said additive to said irrigation water; and (sub-step 1h) then adding the remainder of said additive and said phosphate fertilizer simultaneously to said irrigation water.

9. A method of simultaneous micro-irrigation and phosphate fertilization of agricultural soil according to claim 7 wherein said water-soluble organic acid and said water-soluble organophosphonate comprise an additive, and wherein step 1 is comprised of:

(sub-step 1g) adding a portion of said additive to said irrigation water; and (sub-step 1h) then adding the remainder of said additive and said phosphate fertilizer simultaneously to said irrigation water.

10. A stabilized agricultural micro-fertigation water comprising:

agricultural irrigation water having a pre-additive precipitation factor of from 125 to 1,000 ppm, wherein said precipitation factor is a combined level of total alkalinity (as $CaCO_3$) in ppm and total hardness (as $CaCO_3$) in ppm;

a water-soluble organic acid selected from the group consisting of formic acid and the ammonium, potassium and sodium salts thereof, at a concentration of ac.dos (in ppm)=pf (in ppm)/>7 and <70 wherein ac.dos is the dosage of said water-soluble organic acid and pf is said precipitation factor of said irrigation water;

a water-soluble organophosphonate selected from the group consisting of compounds of Formulas I and II,

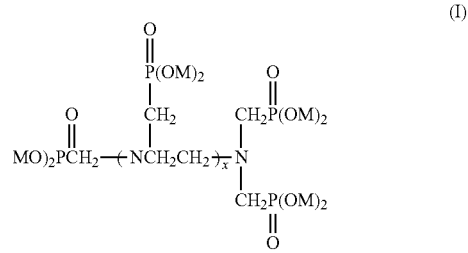

(I)

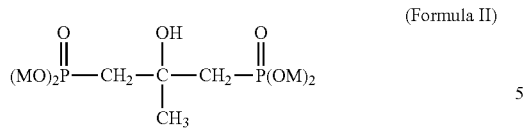 (Formula II)

wherein x is either zero or one and wherein each M is a water-soluble cation independently selected from the group consisting of hydrogen, ammonium, potassium and sodium, at of concentration of op.dos (in ppm)=pf (in ppm)/>50 and <500 wherein op.dos is the dosage of said organophosphonate and pf is said precipitation factor of said irrigation water; and a phosphate fertilizer at a concentration of 40 to 2,100 ppm fertilizer phosphate (as P2O5), prepared according to step 1 of the method of claim 1.

11. A stabilized micro-fertigation water according to claim 10, wherein said organophosphonate is selected from the group consisting of amino-tri(methylene phosphonic acid and 1-hydroxyethylidene-1,1-diphosphonic acid) and the ammonium, potassium and sodium salts thereof.

\* \* \* \* \*